United States Patent
Athias

(10) Patent No.: US 10,321,185 B2
(45) Date of Patent: Jun. 11, 2019

(54) COMMUNICATION SIGNALING ENGINE

(71) Applicant: Comcast Cable Communications, LLC, Philadelphia, PA (US)

(72) Inventor: Franklyn Athias, Cherry Hill, NJ (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 0 days.

(21) Appl. No.: 14/948,601

(22) Filed: Nov. 23, 2015

(65) Prior Publication Data

US 2016/0316258 A1    Oct. 27, 2016

Related U.S. Application Data

(63) Continuation of application No. 13/616,723, filed on Sep. 14, 2012, now Pat. No. 9,282,292, which is a
(Continued)

(51) Int. Cl.
*H04N 21/25* (2011.01)
*H04N 7/173* (2011.01)
(Continued)

(52) U.S. Cl.
CPC ......... *H04N 21/4394* (2013.01); *H04N 7/173* (2013.01); *H04N 21/252* (2013.01); *H04N 21/25875* (2013.01); *H04N 21/4147* (2013.01); *H04N 21/41407* (2013.01); *H04N 21/4227* (2013.01); *H04N 21/440236* (2013.01);
(Continued)

(58) Field of Classification Search
None
See application file for complete search history.

(56) References Cited

U.S. PATENT DOCUMENTS 6,266,615 B1    7/2001 Jin
6,553,345 B1 *  4/2003 Kuhn .................. H04N 21/482
                                                    348/E5.103

(Continued)

FOREIGN PATENT DOCUMENTS

EP    1298923 A1    4/2003
GB    2370456 A     6/2002
(Continued)

OTHER PUBLICATIONS

Extended European Search Report—EP 10169750.6—dated Feb. 18, 2013.
(Continued)

*Primary Examiner* — James R Marandi
(74) *Attorney, Agent, or Firm* — Banner & Witcoff, Ltd.

(57) ABSTRACT

A verbal request for an action to be performed in connection with a user's set-top box may be received by a Program Content Manager (PCM) from a voice-enabled input/output device such as a VoIP-enabled device or a mobile communication device. Alternatively, the user may request an action via email, text message, and the like. The PCM receiving the action request may execute, or schedule the request for later execution, depending on whether the request is for a real-time or future action. The user may also request to send an alert or a program recording request to others. Recipients may be able to request further alerts or confirm a program recording invitation if certain criteria are met.

20 Claims, 6 Drawing Sheets

Related U.S. Application Data continuation of application No. 12/503,134, filed on Jul. 15, 2009, now Pat. No. 8,291,459.

(51) Int. Cl.
    *H04N 21/258*     (2011.01)
    *H04N 21/414*     (2011.01)
    *H04N 21/439*     (2011.01)
    *H04N 21/472*     (2011.01)
    *H04N 21/488*     (2011.01)
    *H04N 21/643*     (2011.01)
    *H04N 21/4147*    (2011.01)
    *H04N 21/4227*    (2011.01)
    *H04N 21/4402*    (2011.01)
    *H04N 21/4786*    (2011.01)
    *H04N 21/4788*    (2011.01)

(52) U.S. Cl.
    CPC ..... *H04N 21/4786* (2013.01); *H04N 21/4788* (2013.01); *H04N 21/47214* (2013.01); *H04N 21/4882* (2013.01); *H04N 21/64322* (2013.01)

(56) References Cited

U.S. PATENT DOCUMENTS

| | | |
|---|---|---|
| 7,143,430 B1 | 11/2006 | Fingerman et al. |
| 2002/0174444 A1* | 11/2002 | Gatto ............... G06Q 30/06 725/133 |
| 2003/0005448 A1* | 1/2003 | Axelsson ............ H04N 7/163 725/58 |
| 2003/0030751 A1 | 2/2003 | Lupulescu et al. |
| 2003/0123618 A1* | 7/2003 | Bhargava ........... H04M 3/4938 379/88.01 |
| 2005/0044254 A1 | 2/2005 | Smith |
| 2005/0155062 A1 | 7/2005 | Hiltunen |
| 2005/0196136 A1 | 9/2005 | Blackketter et al. |
| 2006/0003745 A1* | 1/2006 | Gogic .............. H04M 1/72547 455/413 |
| 2006/0227761 A1 | 10/2006 | Scott |
| 2007/0061149 A1 | 3/2007 | Chang |
| 2007/0157234 A1 | 7/2007 | Walker |
| 2007/0188902 A1 | 8/2007 | Patron et al. |
| 2008/0196060 A1 | 8/2008 | Varghese |
| 2010/0031296 A1 | 2/2010 | Elias et al. |
| 2011/0038469 A1* | 2/2011 | Clark .................... H04M 3/02 379/130 |
| 2017/0186078 A1* | 6/2017 | Pettyjohn .......... G06Q 30/0639 |

FOREIGN PATENT DOCUMENTS

| | | |
|---|---|---|
| WO | 2004036912 A1 | 4/2004 |
| WO | 2004088983 A2 | 10/2004 |
| WO | 2006069603 A1 | 7/2006 |

OTHER PUBLICATIONS http://web.archive.org/web/2008219052448/www.promptu.com, 3 pages, printed Nov. 23, 2009, listed as a 2008 reference in the Internet archive.

Canadian Office Action—CA App. 2,709,780—dated Sep. 9, 2016.

European Decision to Refuse—EP App. 10169750.6—dated Feb. 24, 2017.

Aug. 18, 2017—Canadian Office Action—CA 2,709,780.

* cited by examiner

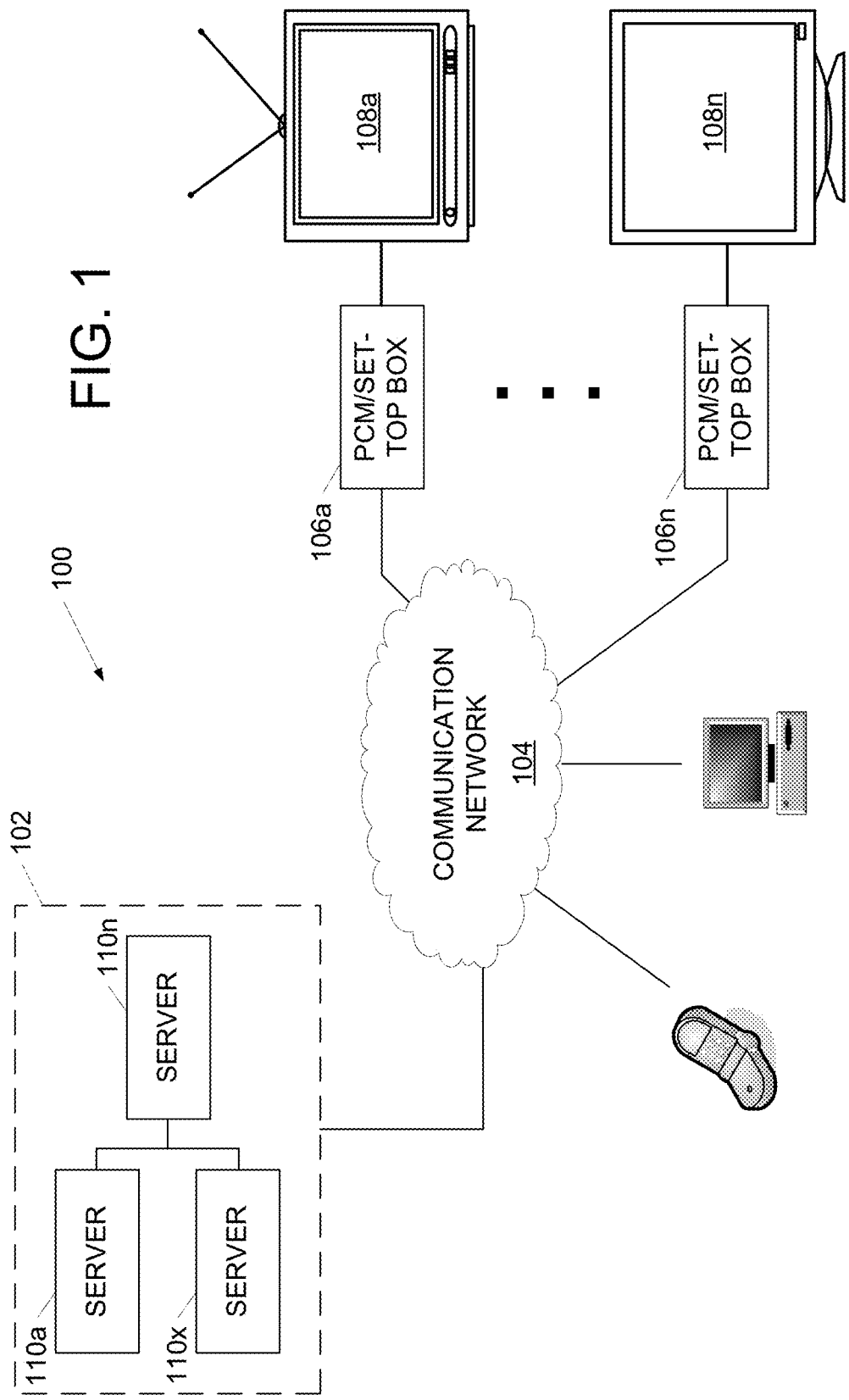

☆ AUTO: YOUR FRIEND JOHN HAS SENT YOU A REMINDER THAT SHOW ABC WILL BE ON TOMORROW, JANUARY 2, 2009 AT 3PM. PLEASE CONTACT YOUR SERVICE PROVIDER FOR AVAILABILITY INFORMATION (11:25 A.M.)

PLEASE DO NOT REPLY TO THIS AUTOMATED MESSAGE.

FIG. 5B

COMMUNICATION SIGNALING ENGINE

CROSS-REFERENCE TO RELATED APPLICATIONS

The present application is a continuation of U.S. application Ser. No. 13/616,723, filed Sep. 14, 2012, which is a continuation of U.S. application Ser. No. 12/503,134, filed Jul. 15, 2009, now U.S. Pat. No. 8,291,459, the contents of which are hereby incorporated by reference.

BACKGROUND

Watching television is much easier today than it was ten or twenty years ago, since many cable or satellite customers now use set-top boxes (STBs) that are more and more sophisticated. For example, an electronic programming guide (EPG) may display television listings for viewing, and may automatically record programs at the customer's selection. These EPGs have become increasingly important in ensuring that a viewer has a pleasant program-watching experience, by providing detailed information on the program options that are available, and by providing users with various options to watch, record, rewind, pause and otherwise manage their television viewing experience.

The additional features are certainly helpful and desirable, but the onset of additional features has, however, complicated the experience as well. Users must now know how to navigate an EPG's menu structure, and use a remote control that can have dozens of buttons. Accordingly, there is an ever-present need to balance the introduction of new features without overcomplicating the television viewing experience.

BRIEF SUMMARY

The following presents a simplified summary of the disclosure in order to provide a basic understanding of some aspects herein that allow users to use spoken words to interact with their STBs. It is not intended to identify key or critical elements of the claimed inventions or to delineate the scope of the claims. The following summary merely presents some concepts of the disclosure in a simplified form as a prelude to the more detailed description provided below.

In one aspect, a programming content manager (PCM) may use voice and/or text messages to convey information to a viewer's device. For example, the viewer may have previously requested that an alert be sent to the viewer's cell phone 30 minutes before the start of any nationally broadcasted sports program. Accordingly, approximately 30 minutes before the start of such a program, the PCM may call a predefined phone number and audibly (e.g., using a spoken voice) alert the viewer. In one alternative, the PCM may leave a message on a voice-answering machine if the viewer is not available. In another example, the PCM may send a SMS message to a predefined address or send an email to a predefined email address, and the like. Other criteria that may lead to the triggering of an alert message include the cancellation or rescheduling of a program, the lack of available recording space to record a program that the user has scheduled for recording, and the like.

In another aspect, the PCM may receive voice and/or textual (e.g., SMS, email) commands from a viewer via, for example, a VoIP-enabled device or any other voice-enabled communication device. The request may be related to television programming. For example, the viewer may request programming information based on certain criteria to be immediately delivered to the viewer (e.g., "What football games are on this Sunday?"). In another example, the viewer may request an alert when a designated show is about to begin ("Please alert me when 'Monday Night Football' is about to begin."). In yet another example, the viewer may request confirmation that a particular program is scheduled to be recorded ("Please confirm that you will record 'Monday Night Football.'"). The PCM may process the audio request and may receive from and send to the requesting viewer, audio, textual, and/or video messages in order to satisfy the request.

In one aspect, the requested action may be a real-time action where the PCM may satisfy the request by performing an action immediately. Alternatively, the requested action may be related to a future action (e.g., to record a particular program in the future). The PCM may schedule the future action or confirm that the future action has been previously scheduled. The PCM may carry out the requested action automatically as scheduled and may send confirmation to the viewer that the requested action was completed. In another example, if the requested action is no longer possible or becomes unavailable, the PCM may send a message to update the viewer of the status.

In another aspect, a PCM may offer social networking options, such as allowing a viewer to share a viewing experience with others via a network. For example, a PCM may forward an alert to additional viewers besides a primary viewer—the alert can serve as a recommendation to the other viewers. Additionally, the PCM may customize the message to the individual recipients, taking into account criteria such as the primary viewer's friends list, the recipients' own preferences, the television subscription level of the recipients, etc.

When the viewers receive the alert, the recipient may be able to accept the invitation and automatically request that the program be recorded at the recipient's own PCM device. In one aspect, where the invitation is delivered to the recipient via email, the recipient may accept the invitation by replying to the email with a message indicating "Please record." In another aspect, where the invitation is delivered to the recipient via an automated voice mail system, the recipient may follow the prompts during the voice call to accept the invitation. Since the alerts may be customized, the PCM may form a different message when sending to a recipient who, for example, does not have recording capabilities. The different message may simply inform the recipient of the upcoming program, without offering the automatic reply recording options.

The methods and systems of the above-referenced embodiments may also include other additional elements, steps, computer-executable instructions, or computer-readable data structures. In this regard, other embodiments are disclosed and claimed herein as well.

The details of these and other embodiments are set forth in the accompanying drawings and the description below. Other features and advantages will be apparent from the description and drawings, and from the claims.

BRIEF DESCRIPTION OF THE DRAWINGS

The present disclosure is illustrated by way of example, but not limited to, the accompanying figures, in which like reference numerals indicate similar elements.

FIG. 1 illustrates a content processing and distribution system according to one or more aspects described herein.

FIGS. 5a & 5b illustrate example messaging that may result using features described herein.

DETAILED DESCRIPTION

Figure 3:
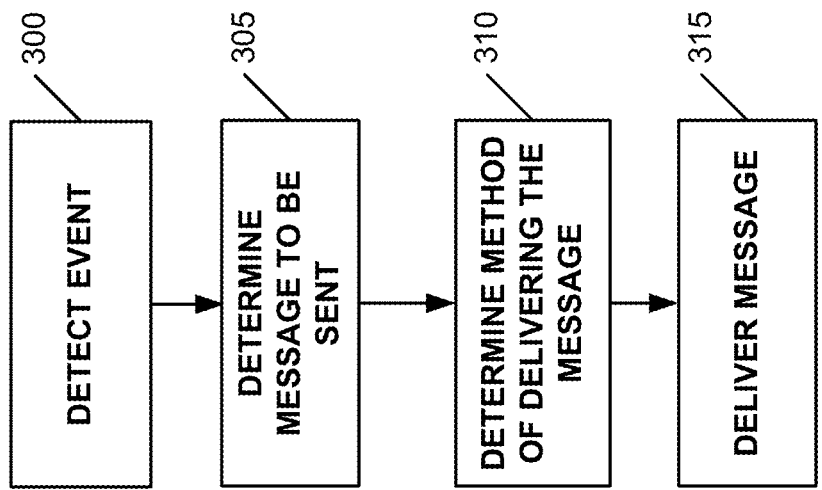
FIG. 3 illustrates an example of a method for initiating a communication to a user according to one or more aspects described herein.

FIG. 1 illustrates a content processing and distribution system 100. The distribution system 100 may include a headend 102, such as a cable television headend. The headend 102 may be connected to a network 104, which may be any type of distribution network, such as a coaxial cable network, hybrid fiber cable network, fiber network, telephone network, wireless or satellite network, etc. The network 104 may also be connected to PCMs 106, why may be implemented using software on a computing device, such as a server or set-top box, and their corresponding receiving devices 108 (e.g., television, computer display, etc.). The distribution system 100 may be used as a media service provider/subscriber system wherein the provider (or vendor) generally operates the headend 102 and the network 104 and also provides a subscriber (i.e., client, customer, service purchaser, user, etc.) with the PCM 106.

The PCM 106 shown in FIG. 1 is located at the subscriber location such as a subscriber's home, a tavern, a hotel room, a business, etc., but it may be located elsewhere if desired. In one aspect, the PCM may be integrated into a set-top box. Alternatively, PCM 106 may instead be a part of a service provider, e.g., as a portion of the headend 102. In yet another alternative, PCM 106 may be a distributed module that includes operations both within the headend 102 and external to the headend 102. The components of PCM 106 may be implemented on any desired computing platform (e.g., personal computer, dedicated server, etc.) and may be configured as hardware, software, firmware and/or combinations thereof.

The PCM 106 may include a capability to record media accessible by the receiving device 108. The recorded media may be stored locally at the PCM 106 device or at a remote location (e.g., on a network server) accessible by the PCM 106. Alternatively, PCM 106 may send/receive information to a remote media recording and storing device accessible by the receiving device 108 and/or its STB.

The receiving device 108 may be provided by the subscribing client. The receiving device 108 may be any type of device used to access content or information from network 104, and may include a television, high definition television (HDTV), monitor, host viewing device, MP3 player, audio receiver, radio, communication device, personal computer, media player, digital video recorder, game playing device, cable modem, mobile telephone, etc. The device 108 may be implemented as a transceiver having interactive capability in connection with the PCM 106, the headend 102 or both the PCM 106 and the headend 102.

The headend 102 may be communicatively coupled to the network 104, which in turn is generally communicatively coupled to the PCM 106, and each PCM 106 is generally communicatively coupled to the respective device 108. While the distribution system 100 is illustrated showing one PCM 106 coupled to one respective receiving device 108, each PCM 106 may be configured with having the capability of coupling more than one device 108.

The headend 102 may include a plurality of devices 110 (e.g., devices 110a-110n) such as data servers, computers, processors, security encryption and decryption apparatuses or systems, processing equipment (e.g., provider operated subscriber account processing servers), television service transceivers (e.g., transceivers for standard broadcast television and radio, digital television, HDTV, audio, MP3, text messaging, gaming, etc.), and the like configured to communicate via the network 104 and provide content data. Content may include any type of media including visual, audio and print. For example, content items may include audiovisual media such as television shows, movies, interviews, news shows; audio media including sound bits, music, books-on-tape; and visual media (e.g., video content or textual data) such as news reports, articles, books, magazines, and the like.

The network 104 may selectively distribute (i.e., transmit and receive) media service provider streams (e.g., standard broadcast television and radio, digital television, HDTV, Video on Demand (VOD), audio, MP3, text messaging, games, etc.) for example, to the PCM 106 and to the receivers 108. The network may include Internet Protocol (IP) based components, and a viewer may communicate with the PCM 106 via an IP communication (e.g., using email, Voice-over IP (VoIP), and the like) from an IP device. In another aspect, a service provider may allow a subscriber to access websites and content providers connected to the Internet (i.e., WAN). Websites may include news sites, social networking sites, personal webpages and the like. In another example, a service provider (e.g., a media provider) may supplement or customize media data sent to a subscriber's set top box using data from the WAN. Accordingly, PCM 106 or headend 102 may have access to content and data on the WAN.

The network 104 may also include one or more cellular networks and/or a public-switched telephone network (PSTN). Such networks may enable a viewer to communicate and/or control a corresponding PCM remotely. The network 104 may be available to the various devices shown in FIG. 1 to communicate and send information to and from one another.

Figure 2:
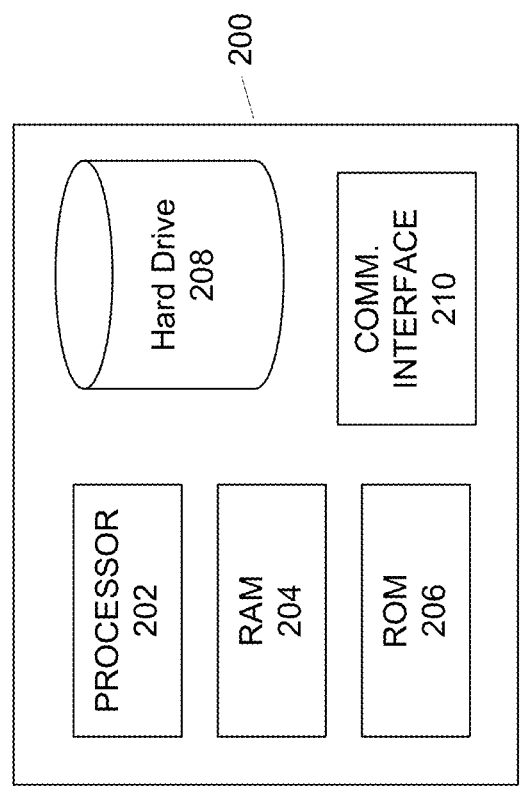
FIG. 2 illustrates a block diagram of a program content manager according to one or more aspects described herein.

FIG. 2 illustrates a block diagram of a computing device 200 that may perform the various features described herein, such as those of the PCM 106, various servers, STBs, etc. The device 200 may include a processor 202 configured to execute instructions stored on one or more computer-readable media, such as random access memory (RAM) 204, read only memory (ROM) 206 and hard drive 208. The memories may store computer-executable instructions that cause the processor 202 and device 200 to operate in the manner described herein. Storage in hard drive 208 may be configured to store a variety of information such as application data, user preference information, content items, broadcast listings, media recording schedules, application programming and the like.

The device 200 may also include communication interface 210, which may include any desired type of hardware and/or software interface used to communicate with other devices over network 104. For example, interface 210 may include any appropriate hard-wired (e.g., twisted pair, coaxial cable, fiber optic cable, hybrid fiber cable, etc.) or wireless (e.g., radio frequency, microwave, infrared, etc.) coupling and protocol (e.g., Home Plug, HomePNA, IEEE 802.11(a-b), Bluetooth, HomeRF, etc.) to meet the design criteria of a particular application and/or network 104.

FIG. 3 illustrates a method for initiating a communication to a user triggered by an event such as one or more criteria being met. For example, this may be used to alert a user that a television program has been rescheduled to air at a different time. At step 300, the PCM may determine that a message is to be sent to the user due to the occurrence of an event. For example, the particular program may have been previously designated to be of interest to the user. In another example, user may have previously requested that an alert be sent to the user when a particular program is about to be broadcasted. In another example, the event may include multiple criteria such as sending an alert to the user if is the present time is 30 minutes prior to the scheduled broadcasting time of the program and no space is available on the user's account to record the program. Such an alert may prompt the user to delete or otherwise make space available for recording the program. For example, the user may be prompted to purchase more space or upgrade the user's account. In another example, the PCM may delete recorded media based on date of recording, frequency of access, and other priority settings. In one aspect, such events may be customizable by the user. The user may access the PCM (e.g., via an Internet connection, or via display 108), and may identify one or more criteria that may result in an alert message. The criteria may, for example, identify the types of situations in which an alert is to be sent. The criteria may include, for example, viewer program preference information (e.g., indicating that this viewer enjoys NFL football games), information requesting notifications of changes in airing schedules of selected programs, system maintenance information (e.g., alerting the user when the media storage space is running low), time of day information (e.g., the user may want alerts sent to different devices, or not at all, at different times of day, identification of STB states in which a message will (or will not) be sent (e.g., a viewer may indicate that while the STB is actively being watched, or while a video on demand is being viewed, that no alerts be sent, or that alerts be redirected), a request to send program recommendations to the viewer's friends, etc.

At step 305, the PCM may determine the message to be sent. For example, if the message is an alert to remind the user that a particular program may be broadcasted soon, the PCM may select a reminder message. In another example, if the alert is for a re-scheduling of a program of interest, the PCM may select a re-scheduling message and, if available, may include the updated time that the program is scheduled to be available for viewing. This may also include determining the one or more recipients who will receive the message. For example, alerts may go to the primary viewer who initially set up the criteria, but additional alerts may be sent to the viewer's family members or friends. This may be accomplished, for example, by having the processor 202 access a contacts database stored on the hard drive 208, and by comparing preference information, subscription levels, etc., to identify suitable recipients for an alert message.

At step 310, the PCM may determine the method of delivery for the message. Delivery methods may include an automated spoken voice call to the user's telephone, an email message sent to the user's email address, or a text message transmitted over the internet (e.g., instant messaging) or transmitted to a user's mobile communication device (e.g., a SMS text message). Delivery methods may also be customized by the user. Alternatively, the PCM may select a method of delivery based on contact information available to the PCM.

At step 315, the PCM may deliver the message to the user using the selected method of delivery. In one aspect, the PCM may deliver the message through the appropriate communication channels. For example, the PCM may deliver an email message via the internet or initiate a VoIP telephone call. Alternatively, the PCM may request that another device perform the delivery of the message.

In addition to receiving PCM-initiated messages, the user may also be able to transmit a message to the PCM, requesting that the PCM perform a function. The request may be received in one of a plurality of different ways. For example, the user may call the PCM and may deliver the request verbally by speaking into a phone. In another example, the user may send a SMS message or an email to the PCM indicating that the user wishes performance of a certain action. The PCM may be configured to respond to requests in a communication method specified by the user. In one aspect, a default communication method for replying to the user may be set to match the method that the user is utilizing to send the request.

In one aspect, the user may spontaneously request the PCM to perform an action, that is, the request may be initiated by the user without prompting. In another aspect, the user's request may be a response to a message delivered by the PCM (e.g., replying "yes" to an alert regarding a new program, signaling to the PCM that the new PCM should be recorded for the user).

Figure 4A:
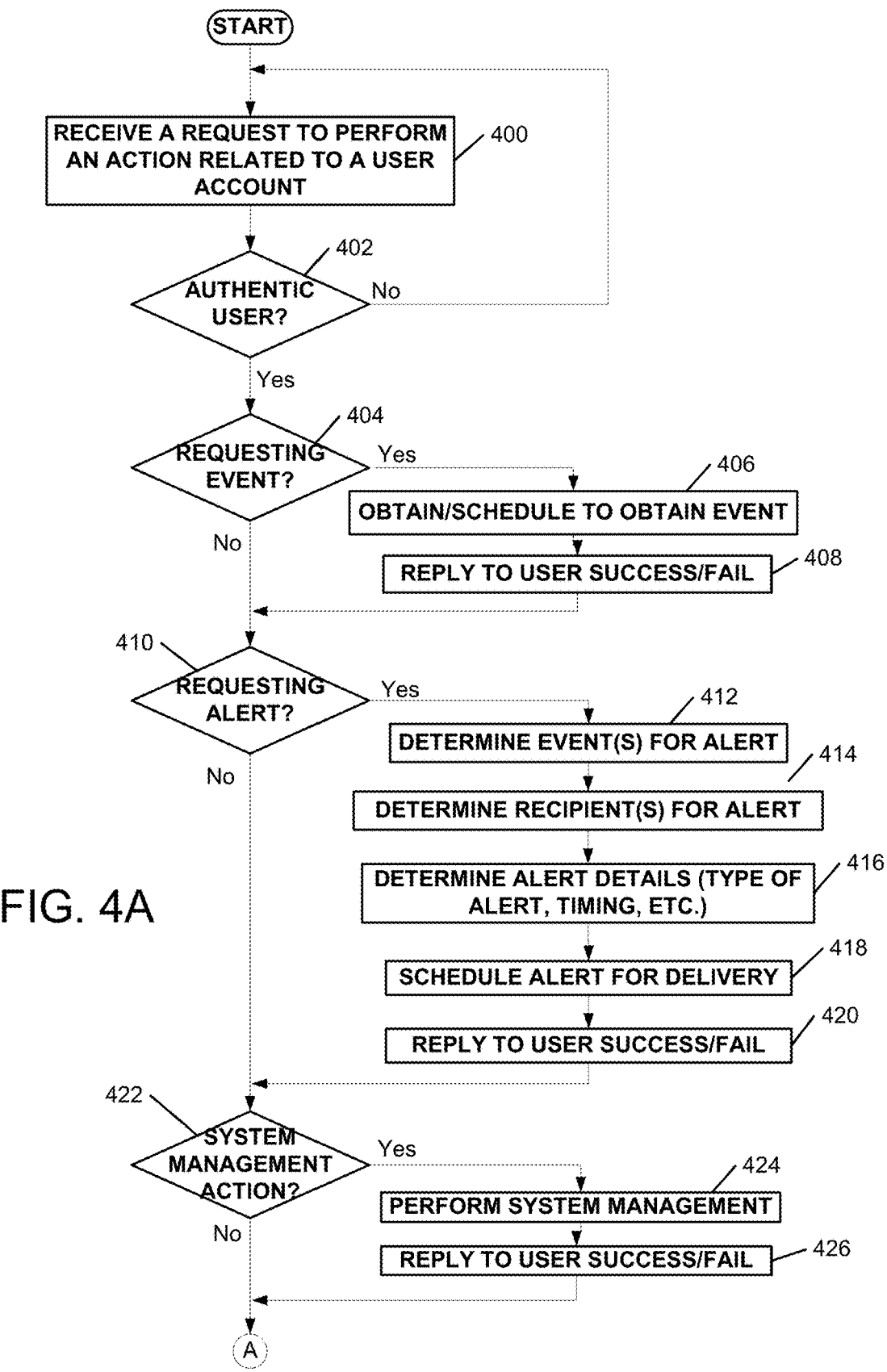
FIGS. 4a & 4b illustrate an example of a method for processing a user's request according to one or more aspects described herein.
Figure 4B:
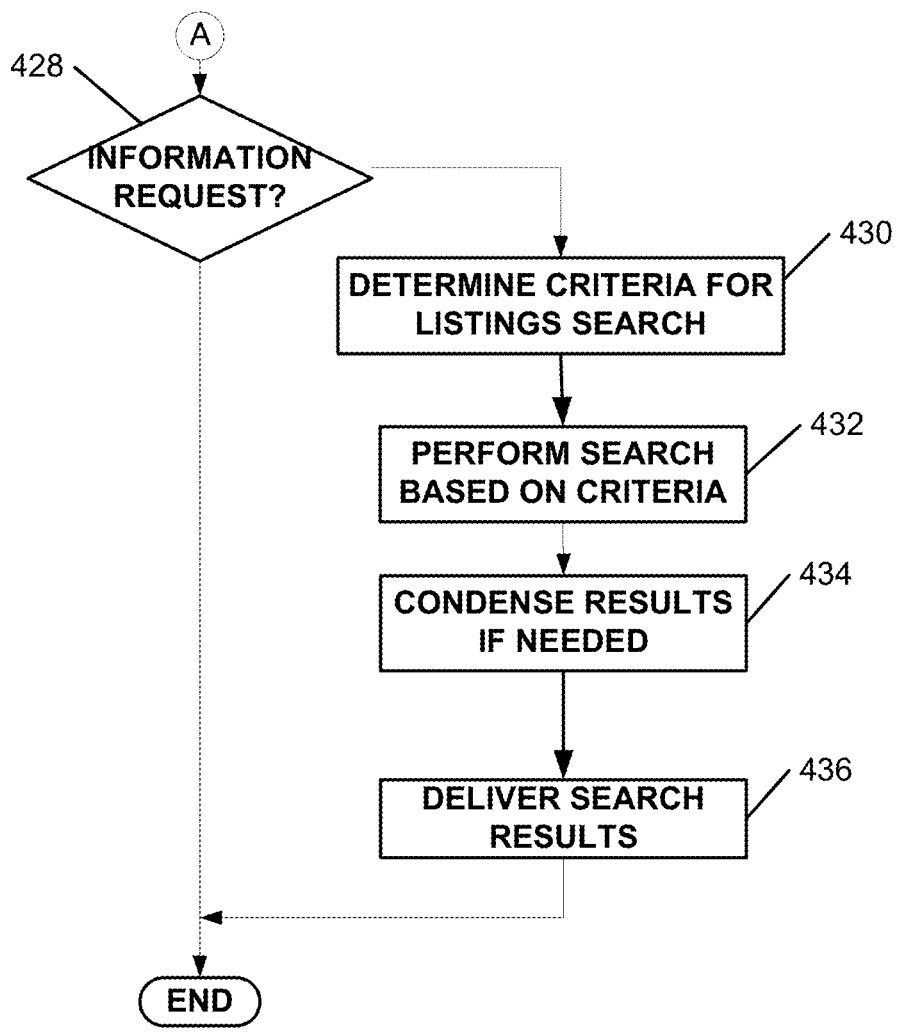

FIG. 4 illustrates a method for processing a user's request for performance of an action. At step 400, a PCM (e.g., PCM 106) may receive a request for an action to be performed related to a particular user's account. The request may arrive in a variety of forms. For example, the request may simply come from a handheld remote control, with the user interacting with the PCM via a STB in the user's home. Alternatively, the user may place a phone call to an automated voice server, which may allow the PCM to receive a spoken verbal command from the user over a telephone. Alternatively, the user may send an email or text (e.g., short message service—SMS) message to an email/text message server associated with the PCM, thereby allowing the PCM to receive emails or text messages containing commands to take some action. As another alternative, the PCM may be associated with an Internet web service, which may offer a web page to allow users to interact with and control their respective PCMs.

At step 402, the PCM may authenticate the user to determine whether the user is authorized to request the action. This may require that the user supply some form of identification information (e.g., a spoken or textual password, a signed or encrypted message, a unique identification code, caller identification information, etc.) to the PCM (or its associated server). The PCM may compare the received identification information with a database of authorized users, and may authenticate the user if the identified user is present in the database. For example, if the user is calling or texting from a phone number which is stored in a database (e.g., database 109) as an authorized phone number for the particular account, the user may be considered to be authenticated. In one aspect, the user may have to provide the customer account number, an address or other identification information to determine the account. Alternatively, if the user is emailing the PCM from an email address which is stored in a database (e.g., database 109), the user may be authenticated and include some other piece of identification information (account number, address, name, and the like) the user may be able to request that the PCM perform certain actions based on account settings. Other conventional methods of authorization and authentication may also be used, such as verifying an inputted passcode for a particular user account and determining which actions are permitted for the particular account.

If the user fails authentication, the system may simply return to step 400 to await the next user request. If the user passes authentication, then the PCM may proceed with processing the user's request. A variety of requests may be supported, and FIG. 4 illustrates several examples. As an example, in step 404, the PCM may check to determine whether the requested action involves scheduling an event to be delivered to the user. An event may be any video, audio, audiovisual program, such as a television show, a pay-per-view movie or event, a television channel, a song, etc.

If the request includes a request to receive an event, then the PCM may, in step 406, obtain the event from a storage (e.g., a database in a memory, such as a hard drive 208) for the user, and/or schedule the event for future delivery to the user. For example, if the user is requesting to record an upcoming episode of a television program, the PCM may add that program's information to an event timer or record listing, so that the requested event is recorded. If the request is for a video-on-demand movie, the PCM may initiate the resources needed to begin the transfer/streaming of the requested movie to the user's PCM (or STB, or any other desired end device). This retrieval may involve the PCM automatically transmitting a request to another device, such as a headend VOD server, to retrieve the requested event.

The identification of the requested event may be contained as data in the original request received in step 400, or may be obtained by other means. For example, the user can be prompted by the PCM (or an appropriate associated component) to speak (if by voice), email (if by email/text), or otherwise signal the title of the desired event. Events may also be identified through the identification of categories or criteria, such as "sports." The requested event need not be a future event. For example, the user may simply issue the request as a channel change request, to immediately see contents on a particular channel Then, in step 408, the PCM may transmit a reply to the user indicating that the request has been successfully processed (or reporting a failure if a failure occurred, such as the event not being available, or being already on a record list). The reply may be an automated telephone call, a voice message, an email, text message, or any other desired form of reply to give feedback to the user.

The PCM may then proceed to step 410, and determine whether the request included a request for an event alerting action. An event alerting action may be any type of message to a recipient (e.g., onscreen prompt, message, email, voice message, etc.) informing the recipient of an event and/or its availability, and may also offer the recipient an option of taking further action in response to the alert. If such an alert was requested, then the PCM may determine, in step 412, which events are to be the subject of the alert. The identification of an event may be obtained in the same manner discussed above.

Then, in step 414, the PCM may determine which recipients are to receive the requested alert. Like the events, the recipients may be identified using data in the original request, or in additional user responses to prompts by the PCM. Recipients may also be identified by predefined groups, such as the user's friends list or contacts list, which may be stored in a database accessible to the PCM (e.g., a database in hard disk 208 of a STB). For example, the user may define a "Heroes Fan Club" friends list, and program alerts may be directed to members of the list.

In step 416, the PCM may determine additional details for the alert message. For example, the PCM may determine what medium the message is to take (e.g., automated phone call, voice message, email, text message, onscreen prompt, etc.), the timing of the message (e.g., identifying times of day in which the alert message should be sent, and where), and any other detail of the alert message. In addition to determining the medium of the alert, the alert contents and response options may also vary. For example, an alert may be sent to multiple recipients (e.g., a list of friends in the user's contact list), some of whom may not subscribe to the same cable service). The alert may be customized to be compatible with the recipient's cable service, and may offer different levels of options for different users. So a recipient who subscribes to a higher level of service may receive an alert that includes an option to automatically have an event recorded by the recipient's own PCM or STB if the user replies with a "Yes" response. A recipient who subscribes to a lower level of service might simply receive an alert reminding them of the upcoming event, with no option to automatically have the event scheduled for recording.

As with the events discussed above, these details may also be included in the original request, or they may be obtained through prompting by the PCM. Some details may be automatic, as well. For example, the user might simply specify that an alert be sent to a predefined group with response options active, and the PCM may automatically consult a database to determine which recipients in the group should receive which type of alert (e.g., identifying the recipients who have response capability, or higher levels of service).

In step 418, the PCM may then schedule the alert for delivery. This may include, for example, adding an entry in a database of alerts to be sent by the PCM. The PCM may then report the successful scheduling of the alert, or the failure if an error occurs, in step 420.

In step 422, the PCM may check to determine whether the request included a request to perform some other form of system management. For example, the user could be requesting to manage the content stored in a hard drive of the user's STB, to make room for an upcoming recording the user wants to make, or to prune outdated content and remove it from the storage. If such a request is included, then the PCM may, in step 424, perform the requested system management. If the request was to manage the user's hard drive storage space, then this performance may include providing the user with a listing (audio, web page, email, etc.) of the content and storage space information (occupied and/or free/available), and accepting user commands (e.g., via spoken commands) to delete or keep the content on the hard drive.

Then, in step 426, the PCM may confirm to the user that the management is complete. For example, the PCM may inform the user that the requested programs have been deleted from the hard drive.

In step 428, the PCM may check to determine whether the request is a request for listings information, such as a television program listing. For example, the user may be calling to ask what time a particular football game will be airing. If such a request is made, then at step 430, one or more criteria for the listings requested may be determined. In one aspect, the parameters or criteria may be default criteria or may have previously been defined by a user (e.g., the user may have set up and saved on the PCM one or more "favorite" search configurations, each consisting of one more search criteria). In another aspect, the user may specify the criteria as part of the request. For instance, the user may place a telephone call to the PCM and indicate (e.g., by voice command) that the user desires a listings request. The PCM may prompt the user for verbal input of the search criteria by using an automated voice messaging system. The user may speak input parameters such as "all sports programs available for viewing next Friday, between 8 p.m. and 10 p.m.". In one aspect, the PCM may parse and search key words received in order to determine the user's request. Optionally, the PCM may confirm whether the search parameters received are indeed the search parameters intended by the user. In one aspect, the user may use a keypad or other input method to supplement or clarify verbal responses.

Once the search criterias are received, the PCM may perform a search at step 432, and may condense the results at step 434 using additional search criteria before delivering the search results at step 436. The delivery may be via voice message, custom web page, text message, email, or any other desired delivery mechanism. The user may also be asked to identify how the results should be delivered, or the initial request may include a specification of how the results should be delivered.

Figure 5A:
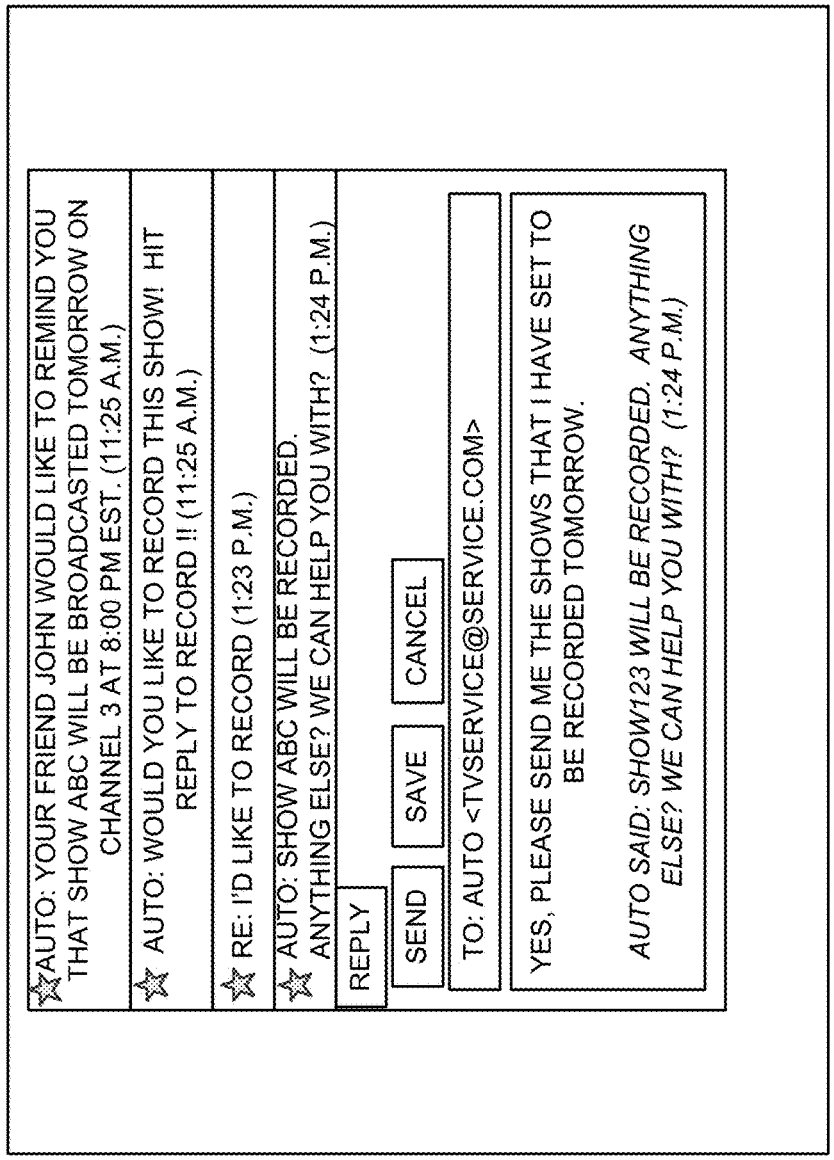

The discussion above shows example flow diagrams of processes to illustrate example features, but the steps may be rearranged, combined, omitted, as desired to present the overall experience. FIG. 5a illustrates an example text message string that illustrates some of the features described above. As shown in FIG. 5a, an initial alert may be received by a recipient ("Your friend John would like to remind you that show 'ABC' will be broadcasted tomorrow on Channel 3 at 8:00 PM EST"). That alert may be sent as in step 315, with content, formatting details and recipient identified as in steps 412-416. Assuming the recipient has a level of service that allows remote scheduling (a detail that may be determined in step 416), the recipient may also be asked whether they would like to record the alerted event ("Would you like to record this show! Hit Reply to Record!!").

If the user replies ("I'd like to record"), then that response may be received by the PCM, and may be handled as a new request issuing from the recipient (e.g., beginning step 400 for the recipient). If desired, this new request may be formulated by the original sender's PCM, and forwarded through network 104 to another PCM that services the recipient.

As part of the interaction, the recipient may be asked if there is anything else to be done, and the user might request a listing of shows set to be recorded ("Yes, please send me the shows that I have set to be recorded tomorrow."), which may be handled as a request as in step 428, and the PCM may respond with the desired information ("Show123 will be recorded.").

A recipient who does not have the capability to record, or who does not have the ability to automatically configure recordings in response to the alert, may receive a simpler alert, such as the one shown in FIG. 5b.

The example above uses textual alerts for ease of explanation, but the prompting and communication may occur through voice as well. In either case, the PCM (or a device associated with the PCM) may have voice recognition and/or text command recognition software/hardware to interpret responses received from the user or recipient.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs).

An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC.

The various components and network elements discussed above may be rearranged as well, and may be combined/subdivided as desired. For example, the PCM is illustrated along with the user's STB, but the two may be combined. Alternatively, the PCM may be located remotely from the user's home, such as at a cable television headend. A single PCM may be assigned to manage the content for a plurality of users.

Although specific examples of carrying out the features above have been described, there are numerous variations and permutations of the above-described systems and methods that are contained within the spirit and scope of the disclosure herein. Additionally, numerous other embodiments, modifications and variations within the scope and spirit of the appended claims will occur to persons of ordinary skill in the art from a review of this disclosure.

I claim:

1. A method comprising:
   receiving, from a first user, a message identifying content;
   determining, based on the message, a second user different from the first user;
   determining a delivery method based on contact information associated with the second user;
   outputting, by a computing device, using the delivery method, and based on a level of service associated with the second user, a first prompt to the second user, wherein the first prompt asks the second user whether the second user would like to record the content;
   receiving, by the computing device and from a control device associated with the second user, a first reply to the first prompt, wherein the first reply comprises a first voice command and indicates a request to record the content; and
   scheduling, based on the first reply, a recording of the content.

2. The method of claim 1, further comprising:
   receiving, via the control device, a second voice command regarding a transmission of second content; and
   transmitting, to the first user, a second message configured to alert the first user about the transmission of the second content.

3. The method of claim 2, further comprising:
   prior to the transmitting the second message, determining a medium for the second message and whether a response option is to be included within the second message.

4. The method of claim 1, wherein the delivery method comprises one or more of: an automated phone call, a voice message, an email, a text message, or an onscreen prompt.

5. The method of claim 1, further comprising:
   transmitting, by the computing device, the first prompt for output to another computing device.

6. The method of claim 1, further comprising:
receiving, by the computing device, a second voice command comprising a passcode; and
authenticating, based on the passcode, the first user, wherein the outputting the first prompt is based on the authenticating.

7. The method of claim 1, wherein receiving the first reply comprises receiving the first voice command via a voice-over Internet Protocol call.

8. A method comprising:
receiving, by a computing device, from a first user, and via a control device, a first voice command comprising an indication of content;
determining, based on the first voice command:
an action associated with the content; and
a second user different from the first user;
determining a delivery method based on contact information associated with the second user;
determining, based on a level of service associated with the second user, a notification specific to the action; and
causing transmitting, to the second user and using the delivery method, of the notification, wherein the notification is configured to allow the second user to reply, to the notification and via a second voice command, to cause the action.

9. The method of claim 8, wherein the action associated with the content comprises at least one of: viewing the content, or recording the content.

10. The method of claim 8, wherein the notification is transmitted via one or more of: an automated phone call, a voice message, an email, a text message, or an onscreen prompt.

11. The method of claim 10, wherein causing transmission of the notification comprises causing another computing device to transmit the notification.

12. The method of claim 8, further comprising:
based on determining that the action is no longer possible or is unavailable, transmitting, to the first user, a second notification indicating that the action is no longer possible or is unavailable.

13. The method of claim 8, further comprising:
receiving, from the first user, a third voice command comprising a passcode; and
authenticating, based on the passcode, the first user, wherein causing transmission of the notification is based on the authenticating the first user.

14. The method of claim 8, further comprising:
receiving, by the computing device and from the second user, the second voice command; and
based on receiving the second voice command, causing the action.

15. A method comprising:
after receiving a message identifying content and from a first user, outputting, by a computing device and based on a level of service associated with a second user different from the first user, a first prompt to the second user, wherein the first prompt asks the second user whether the second user would like to record the content, and wherein the first prompt is output using a delivery method based on contact information associated with the second user;
receiving, by the computing device and from the second user, a first reply to the first prompt, wherein the first reply comprises a first voice command;
and
scheduling, based on determining that the first reply comprises an instruction to record the content, a recording of the content.

16. The method of claim 15, wherein the first reply comprises an identification of additional content, the method further comprising:
recording, by the computing device, the additional content.

17. The method of claim 15, further comprising:
determining, based on the first reply, an action to perform with respect to the content; and
causing the action.

18. The method of claim 15, wherein the first prompt comprises a response option.

19. The method of claim 15, wherein the outputting the first prompt to the second user is based on determining that the second user is permitted to record the content.

20. The method of claim 15, wherein delivery method comprises one or more of: an automated phone call, a voice message, an email, a text message, or an onscreen prompt.

* * * * *

UNITED STATES PATENT AND TRADEMARK OFFICE
CERTIFICATE OF CORRECTION

PATENT NO. : 10,321,185 B2
APPLICATION NO. : 14/948601
DATED : June 11, 2019
INVENTOR(S) : Franklyn Athias Page 1 of 1

It is certified that error appears in the above-identified patent and that said Letters Patent is hereby corrected as shown below:

In the Specification

Column 7, Detailed Description, Line 35:
After "channel", please insert --.--

In the Claims

Column 11, Line 22:
In Claim 8, delete "method," and insert --method--

Column 12, Line 21:
In Claim 15, after "command;", delete "¶"

Column 12, Line 40:
In Claim 20, after "wherein", insert --the--

Signed and Sealed this
Tenth Day of December, 2019

Andrei Iancu
*Director of the United States Patent and Trademark Office*